(12) United States Patent
Lawrence

(10) Patent No.: US 8,146,854 B2
(45) Date of Patent: Apr. 3, 2012

(54) DUAL ROTOR VERTICAL TAKEOFF AND LANDING ROTORCRAFT

(76) Inventor: John M. Lawrence, Palm Harbor, FL (US)

(*) Notice: Subject to any disclaimer, the term of this patent is extended or adjusted under 35 U.S.C. 154(b) by 365 days.

(21) Appl. No.: 12/519,988

(22) PCT Filed: Feb. 28, 2008

(86) PCT No.: PCT/US2008/055252
§ 371 (c)(1),
(2), (4) Date: Jun. 18, 2009

(87) PCT Pub. No.: WO2008/140851
PCT Pub. Date: Nov. 20, 2008

(65) Prior Publication Data
US 2010/0025526 A1 Feb. 4, 2010

Related U.S. Application Data

(60) Provisional application No. 60/892,105, filed on Feb. 28, 2007.

(51) Int. Cl.
*B64C 27/10* (2006.01)
(52) U.S. Cl. .................................. 244/17.23
(58) Field of Classification Search ............ 244/6, 7 R, 244/7 A–7 C, 17.11, 17.19, 17.21, 17.23, 244/17.25, 48, 12.4, 69, 45 R, 39, 56
See application file for complete search history.

(56) References Cited

U.S. PATENT DOCUMENTS

| | | | |
|---|---|---|---|
| 2,300,268 A | 1/1940 | Stuart, III |
| 2,382,460 A | 1/1941 | Young |
| 2,387,762 A | 1/1941 | Leonard |
| 2,328,786 A | 3/1941 | Crowder |
| 2,397,632 A | 3/1941 | Stuart, III |
| 2,437,789 A | 9/1942 | Robins |
| 2,444,781 A | 12/1943 | Leonard |
| 2,486,059 A | 10/1945 | Pentecost |
| 2,622,826 A | 6/1946 | Prince |
| 2,712,420 A | 12/1951 | Amster et al. |
| 2,743,886 A | 7/1952 | Driggs et al. |
| 4,123,018 A | 10/1978 | Tassin de Montaigu |
| 4,519,743 A | 7/1982 | Ham |
| 4,648,345 A | 9/1985 | Wham et al. |
| 4,720,059 A | 12/1986 | Stearns, Jr. |
| 4,756,667 A | 7/1987 | Wyrostek et al. |

(Continued)

OTHER PUBLICATIONS

Leonard, Lloyd. 1st Convertible Aircraft Congress Proceedings. "Design studies of various tilting fuselage convertible aircraft." pp. 35-50. Philadelphia, 1949.

*Primary Examiner* — Tien Dinh
*Assistant Examiner* — Nicholas McFall
(74) *Attorney, Agent, or Firm* — C. Douglas McDonald; William G. Giltinan; Carlton Fields, PA

(57) ABSTRACT

A rotorcraft having two coaxial, counter-rotating rotors, one proximate to the forward end of the fuselage and one proximate to the aft end of the fuselage, that generate the forces necessary to lift the craft and maneuver it in the air by adjusting the pitch of the rotor blades throughout their rotation, and a method of flying a dual rotor rotorcraft involving taking off in a vertical orientation, climbing vertically, transitioning to generally horizontal flight, flying horizontally, and subsequently repeating the sequence in reverse to land again in a vertical orientation.

8 Claims, 14 Drawing Sheets

U.S. PATENT DOCUMENTS

| | | |
|---|---|---|
| 5,263,846 A | 9/1992 | Smith |
| 5,289,994 A | 3/1994 | Del Campo Aguilera |
| 5,626,312 A | 7/1994 | Head |
| 5,765,783 A | 2/1996 | Albion |
| 6,347,764 B1 | 2/2002 | Brandon et al. |
| 2005/0051667 A1* | 3/2005 | Arlton et al. ............ 244/17.11 |
| 2006/0011777 A1* | 1/2006 | Arlton et al. ............ 244/7 B |

* cited by examiner

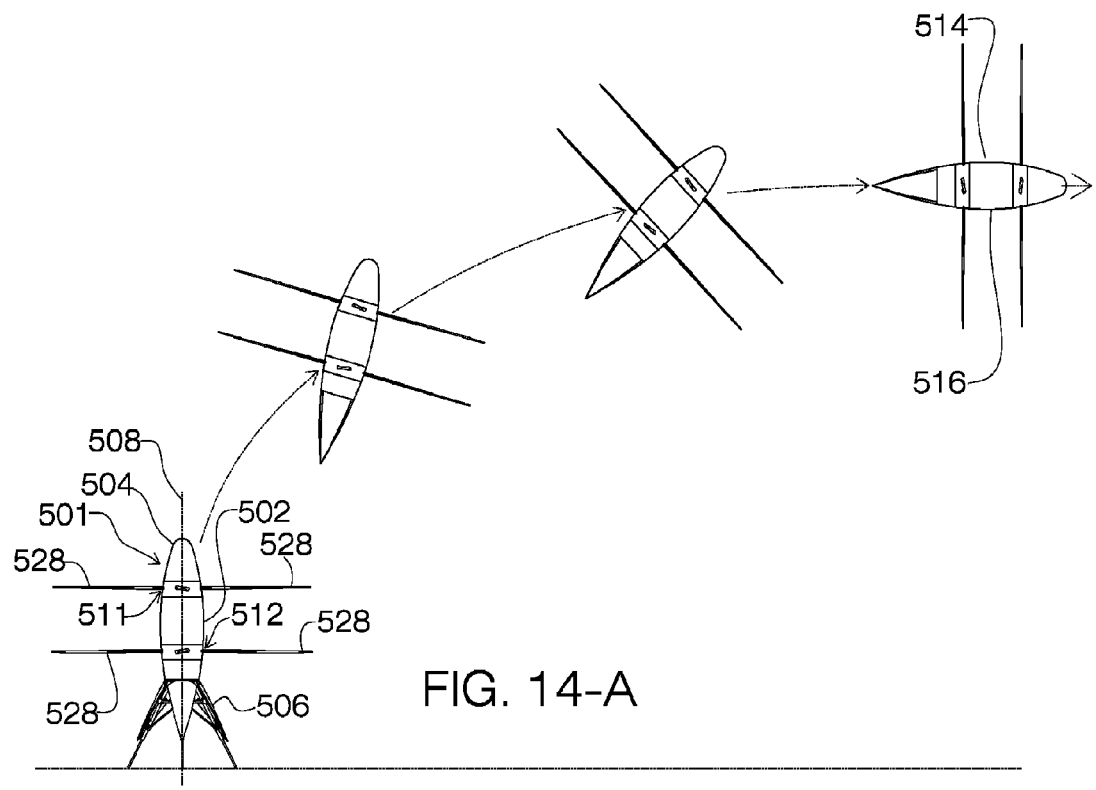
FIG. 14-A
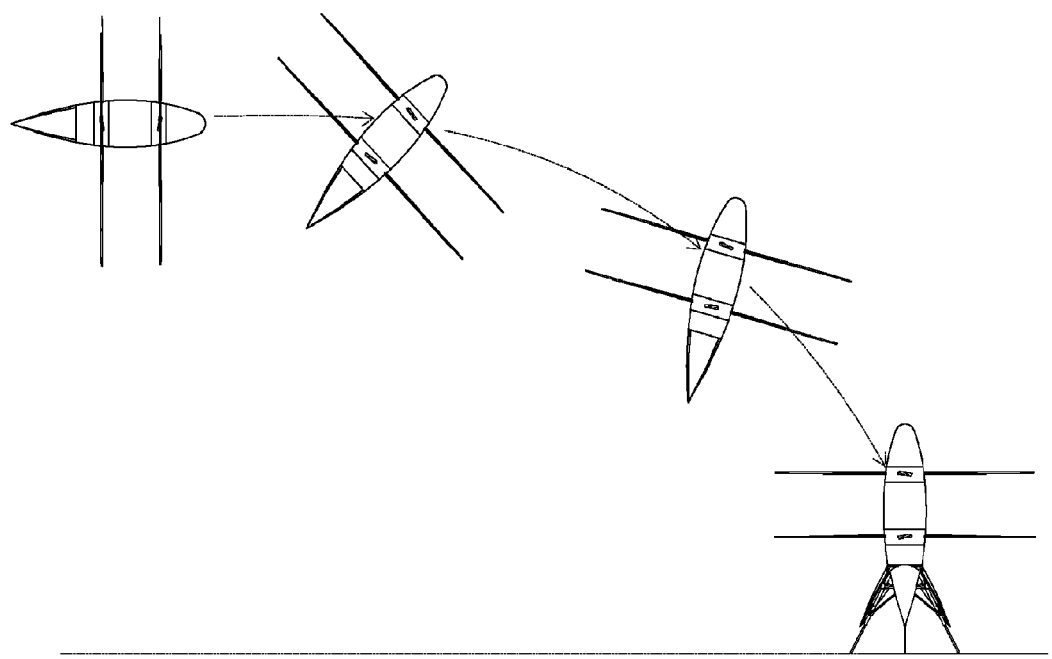
FIG. 14-B

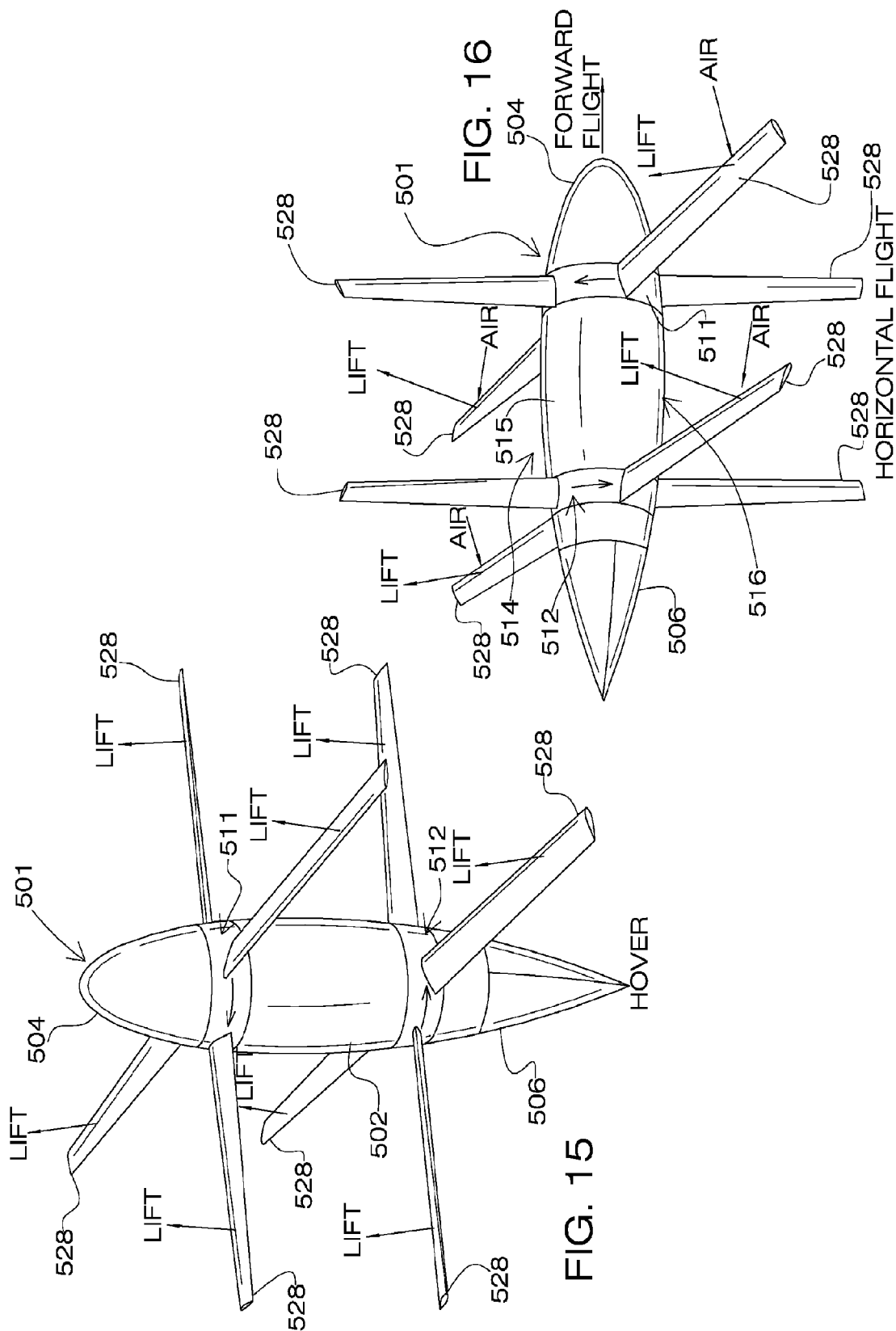

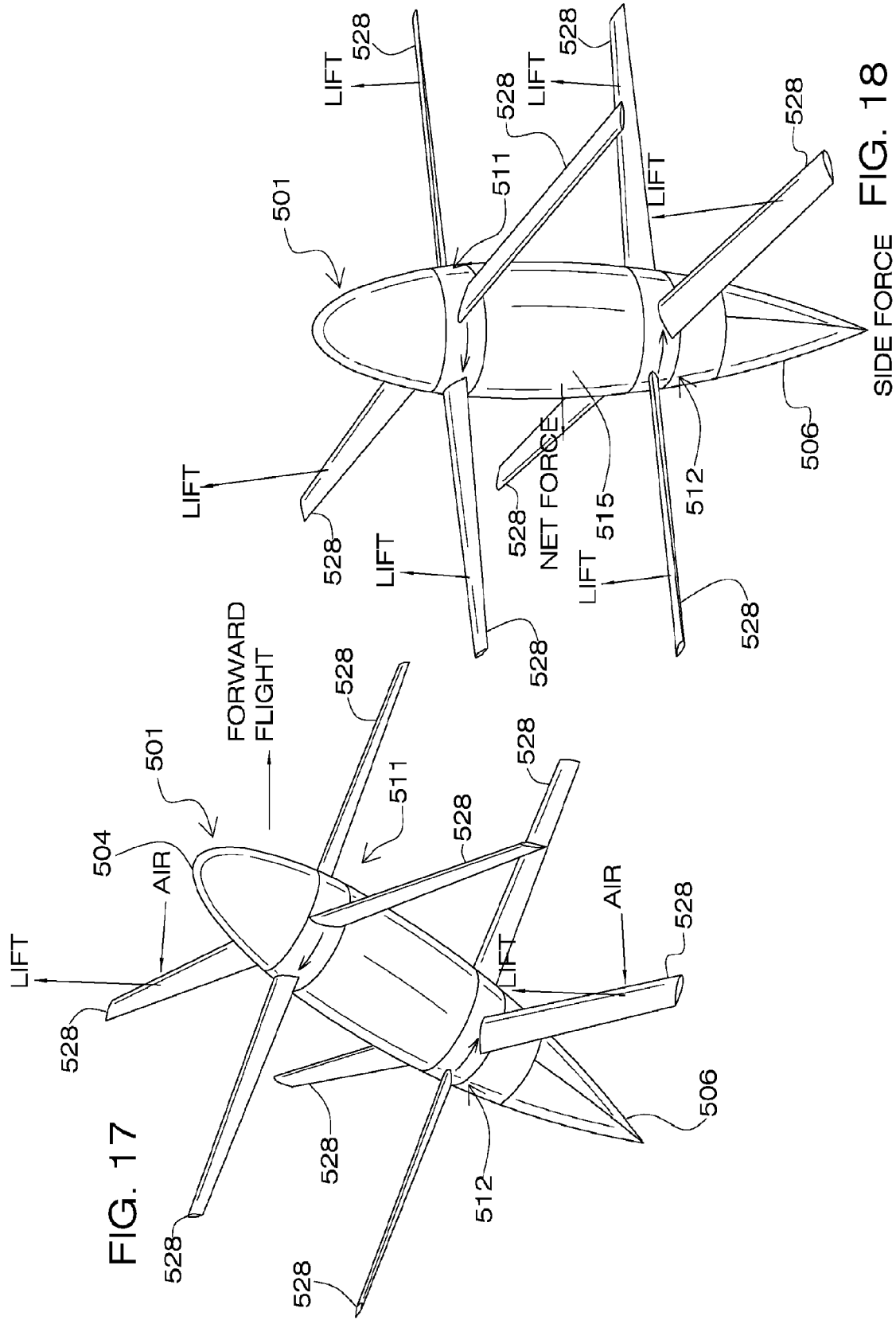

DUAL ROTOR VERTICAL TAKEOFF AND LANDING ROTORCRAFT

BACKGROUND

The present invention relates to an aircraft structure wherein conventional wings are omitted and two, coaxial, counter-rotating, rotors utilize high speed cyclic pitch and collective pitch control to generate the forces necessary to lift the craft, maneuver it, and propel it through the air. A method of flight utilizing such a craft is also disclosed.

Dual coaxial rotor rotorcraft are known in the art. However, such rotorcraft typically cannot operate in a generally horizontal orientation without utilizing fixed wings to generate lift. Because fixed wings contribute to skin friction drag at cruise speeds, an air vehicle, capable of generating the necessary lift and directional forces for vertical take off and landing, vertical hovering, and horizontal flight, without the use of fixed wings is desirable.

Accordingly, it is an object of the present invention to provide a dual coaxial rotor rotorcraft capable of taking off vertically, hovering, transitioning to horizontal flight, returning to vertical hovering, and landing vertically, all without the benefit of fixed aerodynamic appendages.

SUMMARY

According to the present invention, there is provided a dual coaxial rotor rotorcraft and a method of flight. The rotorcraft includes a fuselage having a forward end and an aft end, and two co-axial, counter-rotating rotor assemblies, one of which is proximate to the forward end of the fuselage and one of which is proximate to the aft end of the fuselage. Each rotor assembly further includes high-speed actuators capable of adjusting the pitch of each blade independently and continuously throughout the entire rotational cycle of each blade. The actuators are controlled wirelessly by an onboard control system having a computer-based controller, at least one accelerometer, at least one rate gyroscope, a wireless interface, and a wireless transceiver. The onboard control system wirelessly receives flight commands from a remote flight control module through the wireless transceiver, determines the rotor speed and pitch angles necessary at each rotational point, and directs the rotor drive motors to adjust the speed of the rotors and wirelessly directs the high speed actuators through the wireless interface to adjust the pitch of each blade such that the rotors generate the necessary forces and the vehicle executes the flight commands.

The method of flight is directed to a dual coaxial rotor rotorcraft having one rotor assembly proximate to the forward end of the fuselage and one rotor assembly proximate to the aft end of the fuselage, each such rotor assembly including two or more independently controllable, continuously-variable-pitch blade assemblies. The method includes the steps of taking off from an orientation in which the rotor axis is generally vertical, adjusting the pitch of the rotor blades to generate forces perpendicular to the rotorcraft axis to cause the craft to pitch forward in the direction of travel until the rotorcraft is in a generally horizontal orientation, flying in a generally horizontal orientation, transitioning back to a generally vertical orientation by adjusting the pitch of the rotor blades to generate forces perpendicular to the rotorcraft axis to cause the craft to pitch nose up until the rotorcraft is in a generally vertical orientation, and landing in a generally vertical orientation.

Other features and advantages of the invention will become apparent from the following description, including the drawings and the claims.

BRIEF DESCRIPTION OF THE DRAWINGS

Other features in the invention will become apparent from the attached drawings, which illustrate certain preferred embodiments of the rotorcraft and method of this invention, wherein

FIG. 15 is a perspective view of one preferred embodiment of the rotorcraft of the present invention illustrating lift vectors generated in vertical hover, FIG. 16 is a perspective view of one preferred embodiment of the rotorcraft of the present invention illustrating lift vectors generated in horizontal flight, FIG. 17. is a perspective view of one preferred embodiment of the rotorcraft of the present invention illustrating lift vectors generated in the transition from vertical flight to horizontal flight, and FIG. 18 is a perspective view of one preferred embodiment of the rotorcraft of the present invention illustrating lift vectors generated when maneuvering in a vertical orientation.

DETAILED DESCRIPTION

While the following describes preferred embodiments of the rotorcraft and method of this invention, it is to be understood that this description is to be considered only as illustrative of the principles of the invention and is not to be limitative thereof, as numerous other variations, all within the scope of the invention, will readily occur to others. In this specification, the term "adapted" shall mean configured, dimensioned, oriented and arranged as appropriate.

Figure 1:
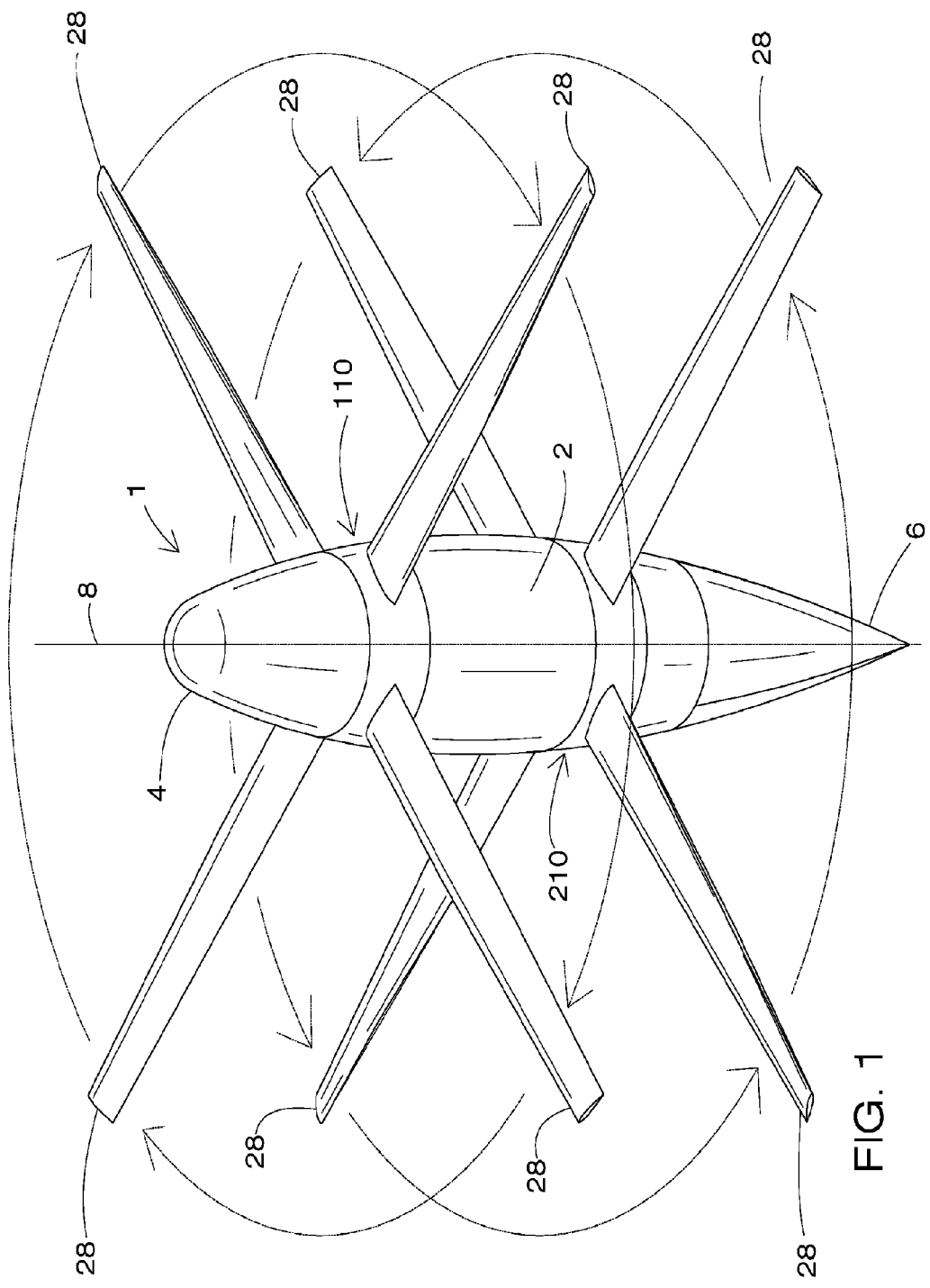
FIG. 1 is a perspective view of one preferred embodiment of the rotorcraft of the present invention.
Figure 2:
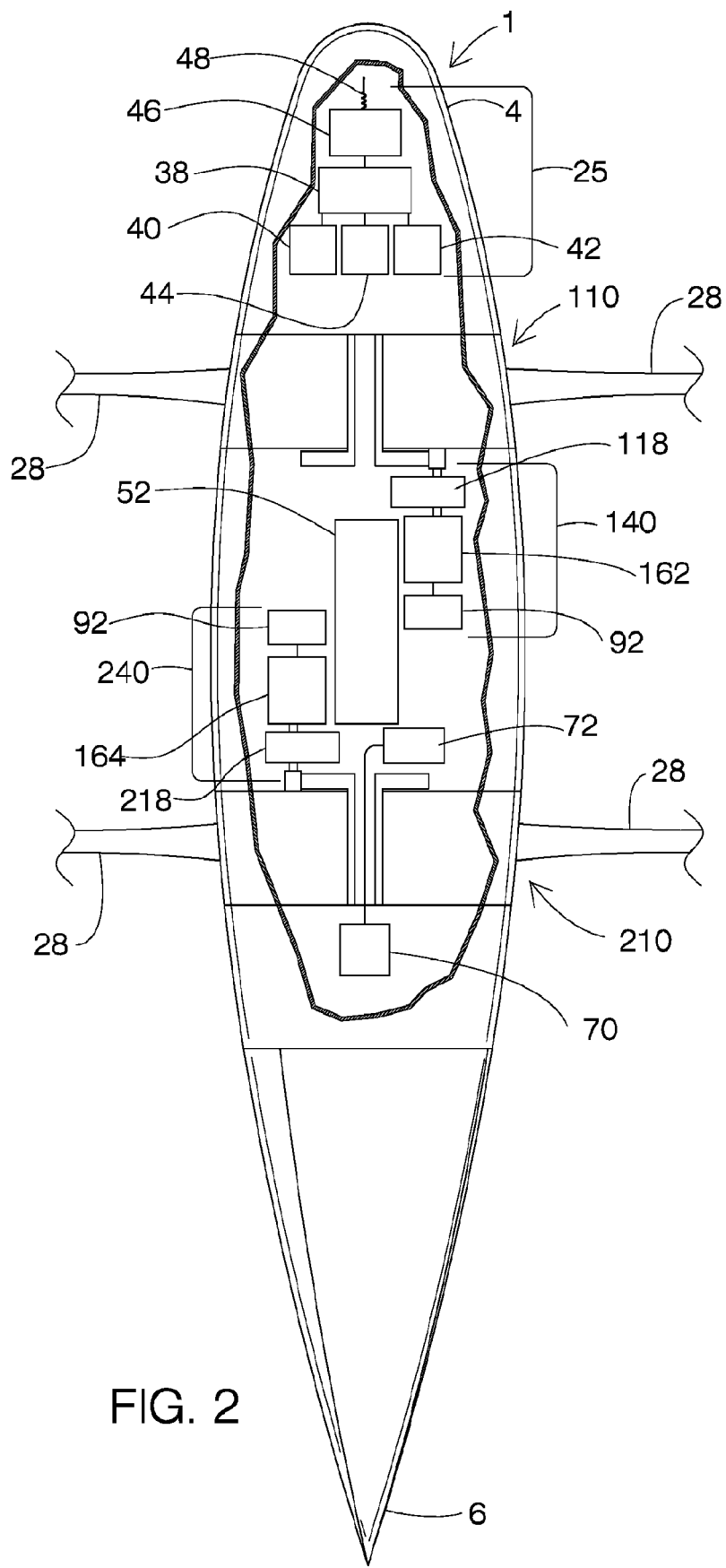
FIG. 2 is a side view, partially in section, of one preferred embodiment of the rotorcraft of the present invention having dual rotor drive motors and showing internal components in block diagram form.
Figure 3:
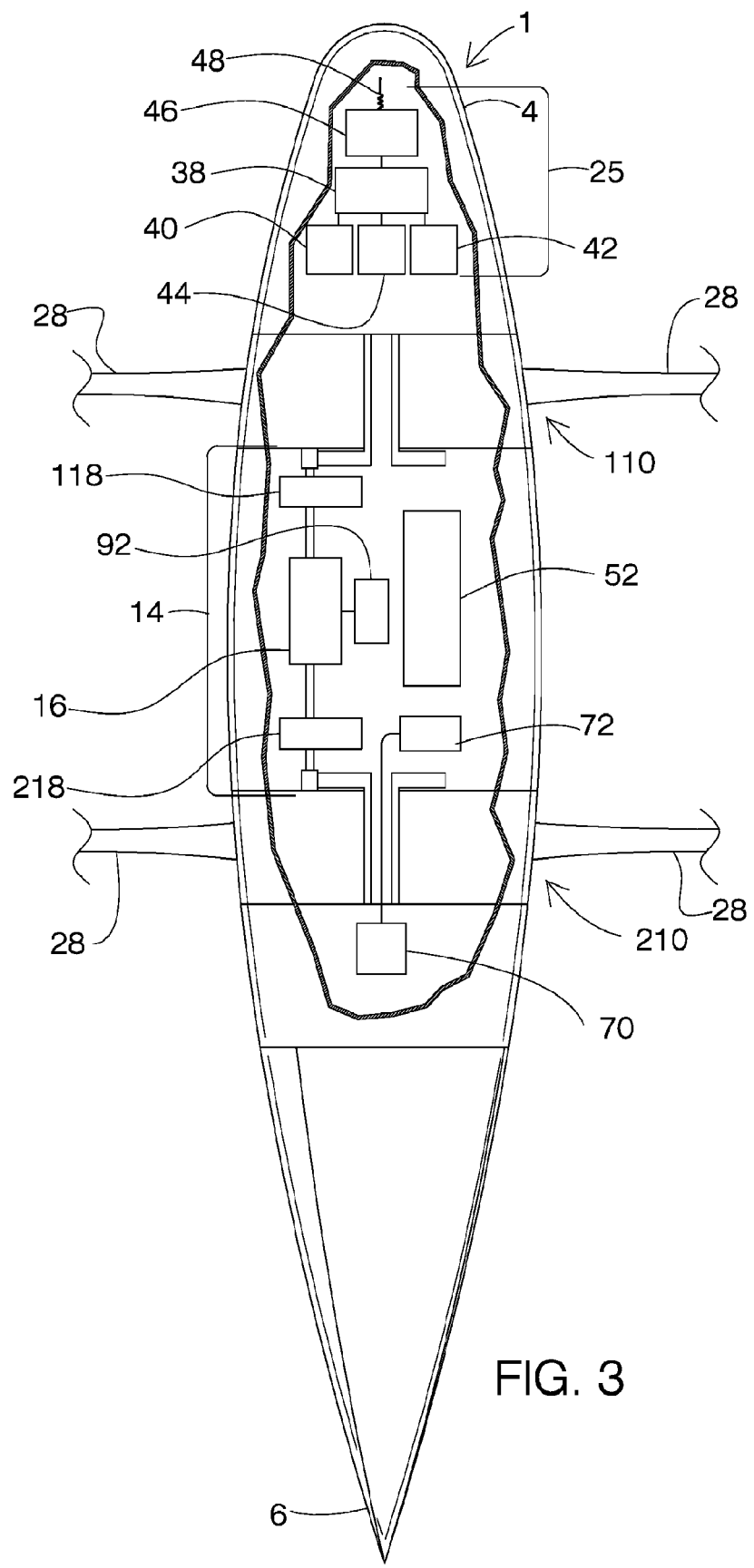
FIG. 3 is a side view, partially in section, of one preferred embodiment of the rotorcraft of the present invention having a single rotor drive motor and showing internal components in block diagram form.
Figure 4:
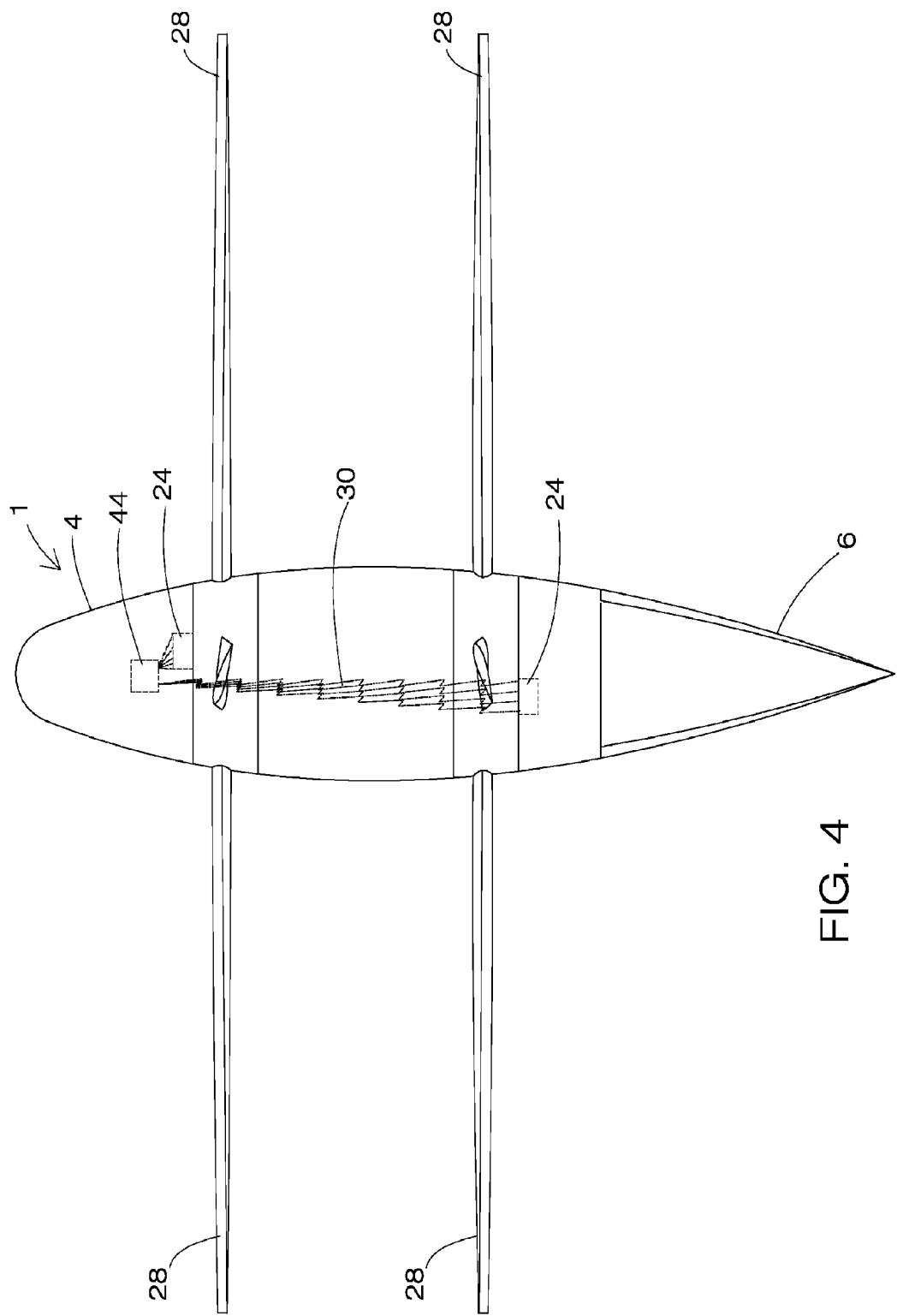
FIG. 4 is a side view of one preferred embodiment of the rotorcraft of the present invention illustrating internal wireless communications components in phantom.
Figure 5:
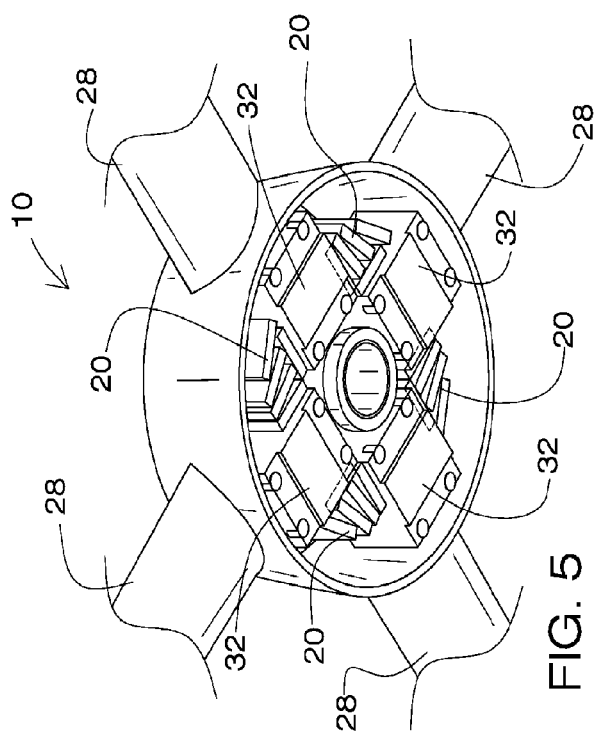
FIG. 5 is a perspective view of a rotor assembly of one preferred embodiment of the rotorcraft of the present invention.

FIGS. 1-18 illustrate preferred embodiments of the rotorcraft and methods of this invention. The rotorcraft 1, which may conveniently be a remotely piloted vehicle, generally comprises a fuselage 2 having a forward end 4 and a rear, or aft, end 6, with a longitudinal axis 8 extending generally through said forward end 4 and said aft end 6. The rotorcraft 1 further comprises two counter rotating rotor assemblies 10 (FIG. 5), one of which is a forward rotor assembly 110 proximate to the forward end 4 and one of which is an aft rotor assembly 210 proximate to the aft end 6, and each of which is coaxial with longitudinal axis 8. The fuselage 2 is preferably in the form of a cylinder with tapering ends 4, 6, but may include bulges (not illustrated) as necessary to accommodate internal components and payloads. The rotor assemblies 10 are driven by a rotor drive system 14 as shown in FIG. 3. The rotor drive system 14 comprises at least one rotor drive motor 16 mechanically connected to at least one rotor drive gear set shown in FIG. 6, said gear set(s) being indicated as elements 118 and 218 in FIGS. 2 and 3 and being mechanically connected, respectively, to forward rotor assembly 110 and aft rotor assembly 210, and geared so that rotor assemblies 110, 210 are kept rotating in opposite directions at substantially the same speed, thereby helping avoid instability and unwanted rotation of fuselage 2. As shown in the illustrations, the preferred embodiment of the rotorcraft has no wings or attached airfoils, but only the rotating rotor assemblies for aerodynamic for lift and control.

Figure 7:
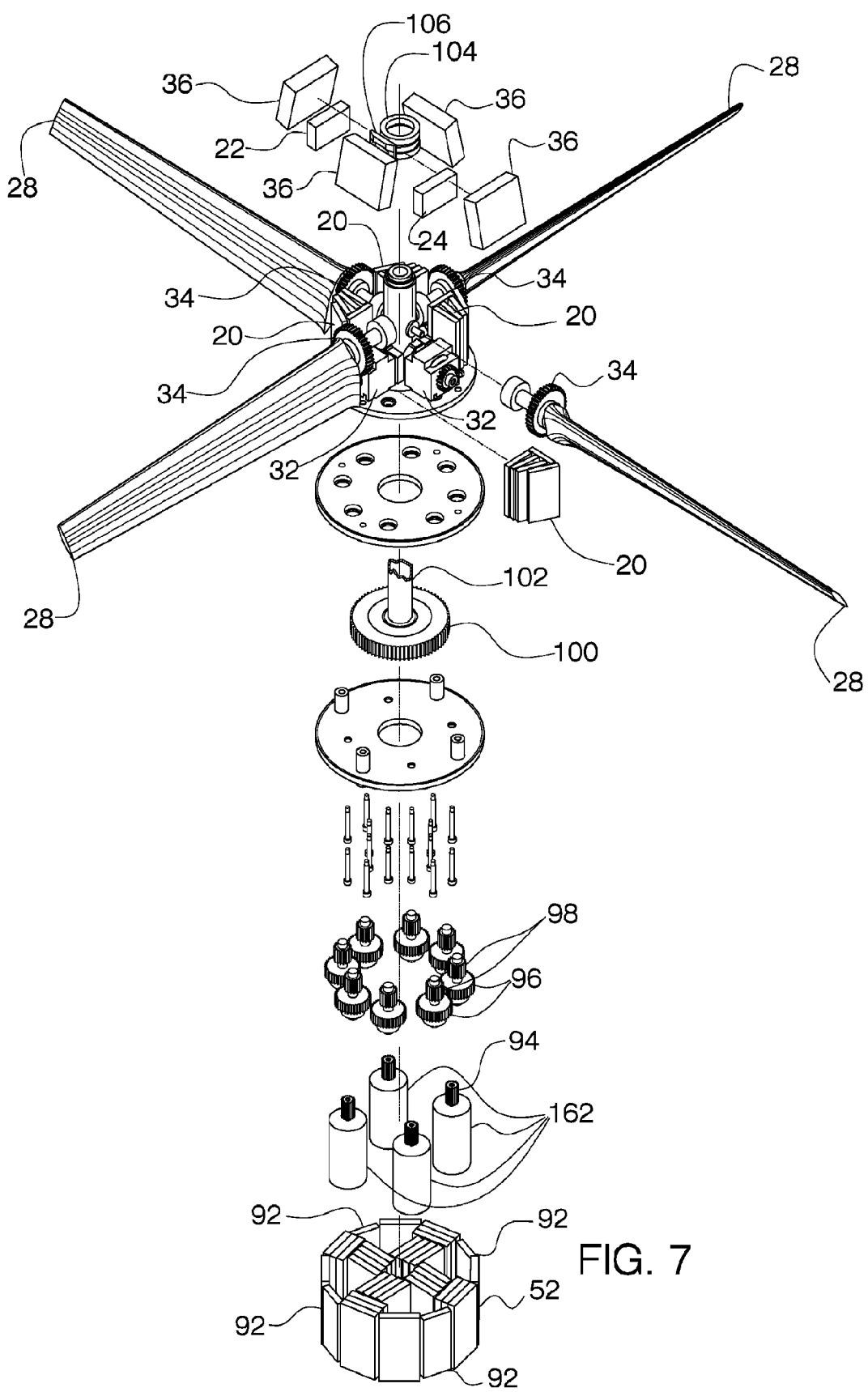
FIG. 7 is an exploded perspective view of the rotor drive and rotor assemblies of one preferred embodiment of the rotorcraft of the present invention.
Figure 8:
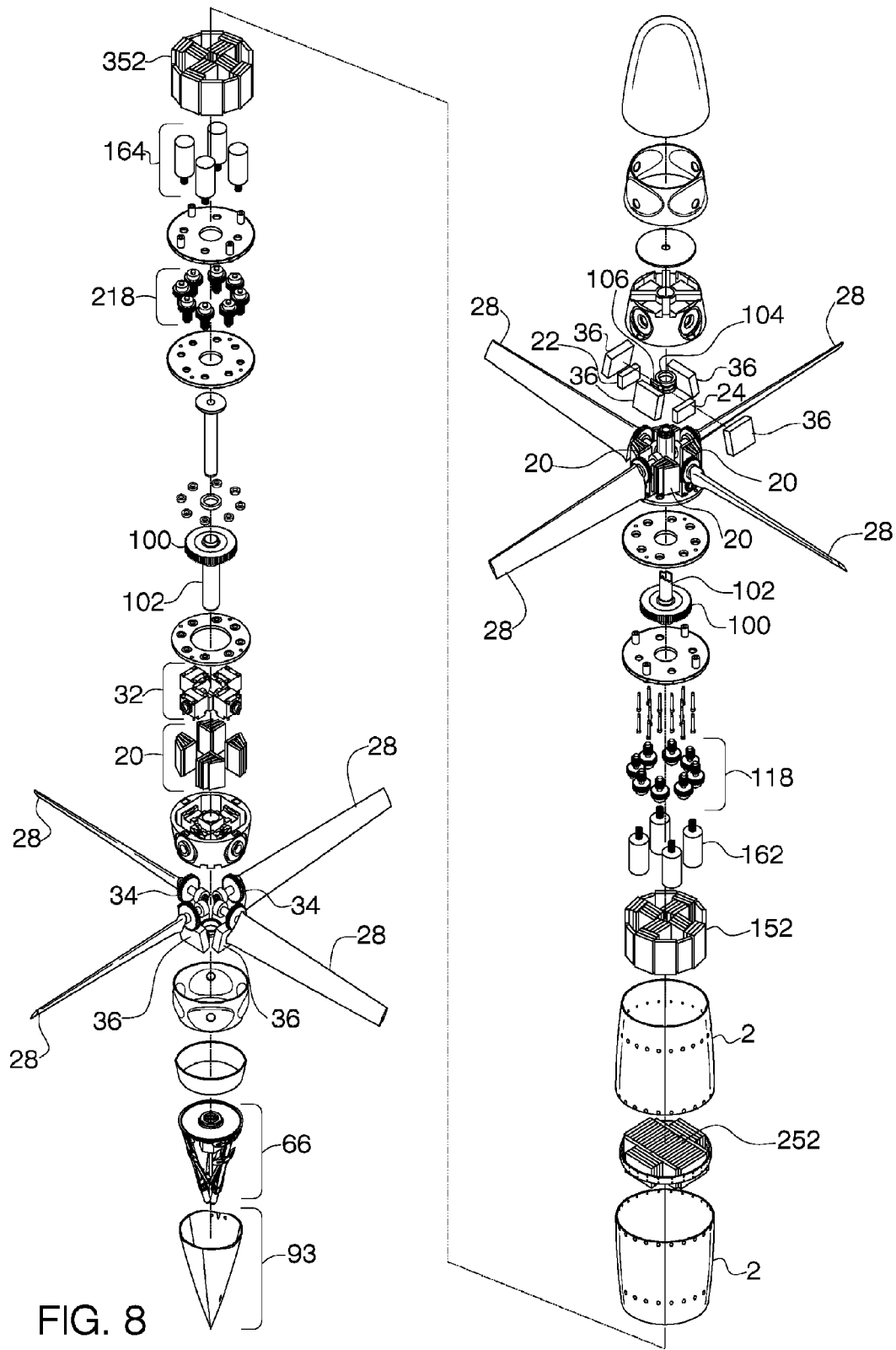
FIG. 8 is an exploded perspective view of the rotor drive and rotor assemblies of one preferred embodiment of the rotorcraft of the present invention.
Figure 9:
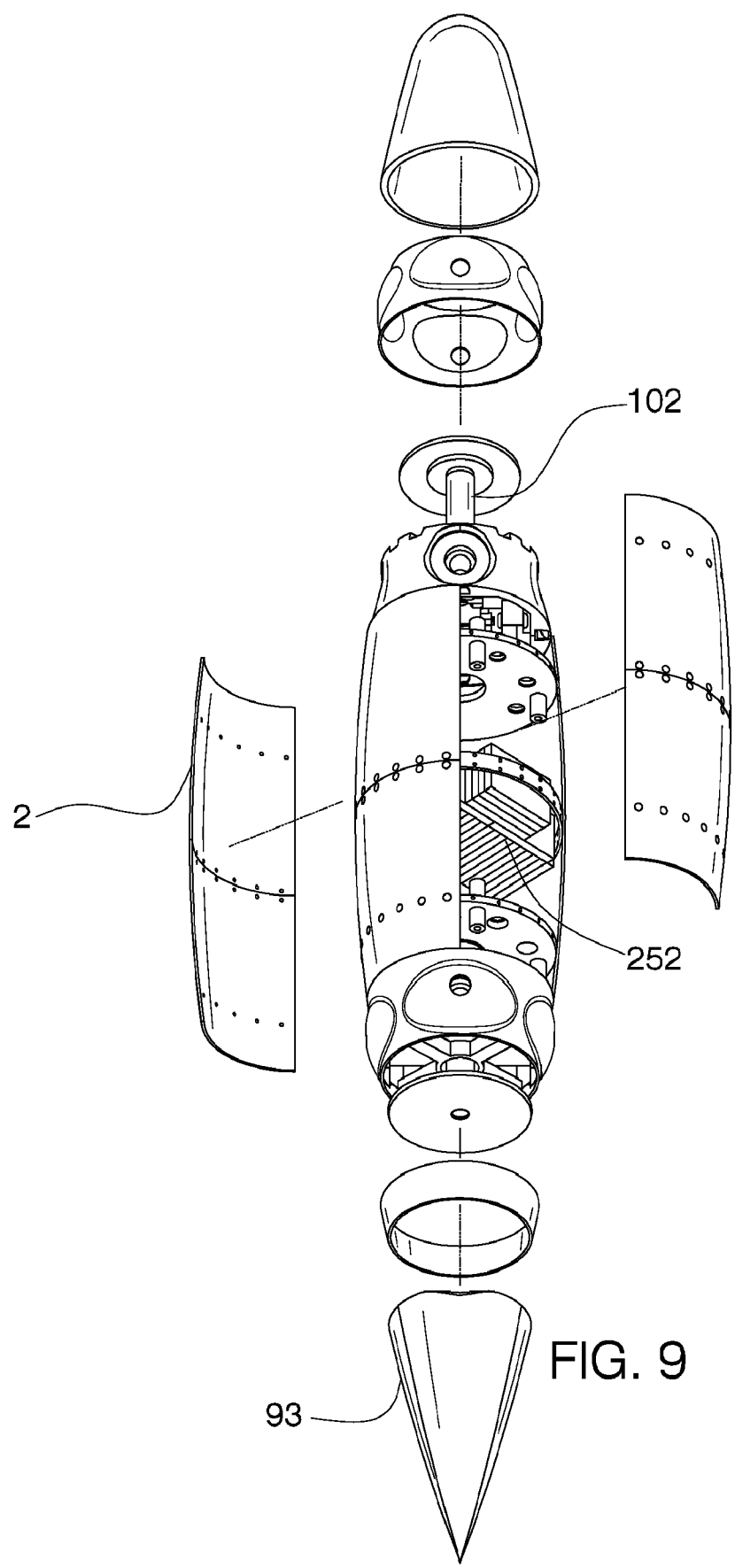
FIG. 9 is an exploded, perspective view of the fuselage components of one preferred embodiment of the rotorcraft of the present invention.
Figure 10:
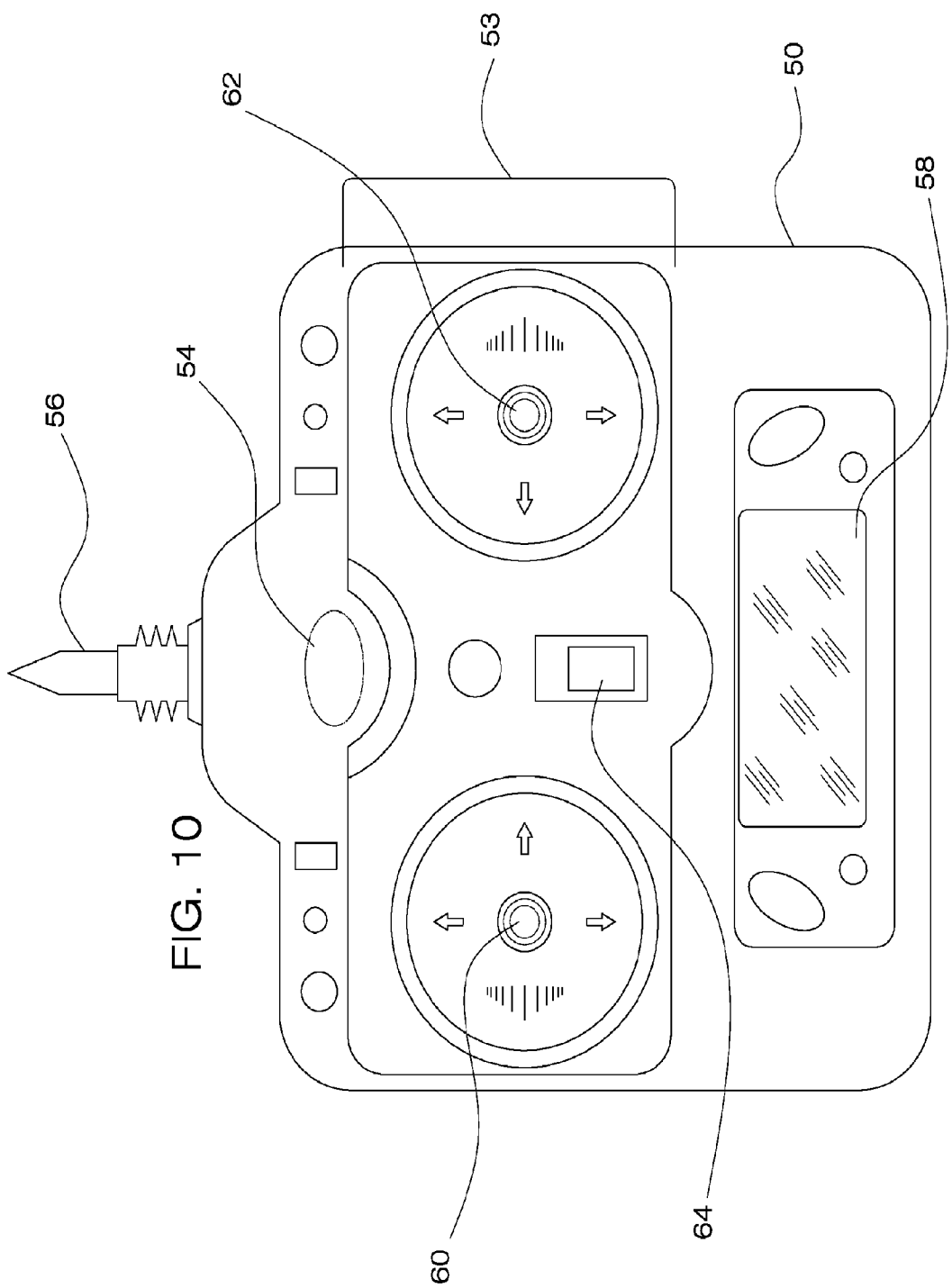
FIG. 10 is a plan view of the remote flight control module of one preferred embodiment of the rotorcraft of the present invention.

As shown in FIGS. 7 and 8, each rotor assembly 10 comprises a rotor battery pack 20, preferably being made up of five Kokam rechargeable lithium-polymer cells, wired in series, per variable pitch blade assembly, a rotor blade controller 22 electrically connected to rotor battery pack 20, wireless rotor blade interface 24 electrically connected to rotor blade controller 22, and at least two, but preferably four, continuously variable pitch blade assemblies. Preferably, all four rotor battery packs 20 are connected and jointly provide electrical power to wireless rotor blade interface 24 and rotor blade controller 22, in addition to actuator drive amplifier 36 and actuator drive 32 discussed more fully below. Wireless rotor blade interface 24 wirelessly receives commands from the onboard controller 25, which is illustrated in FIGS. 2 and 3 and is discussed below, and relays those commands to rotor blade controller 22. Rotor blade controller 22 then directs the blade assemblies, discussed more fully below, to adjust the pitch of blades 28 at each point in their rotation about the fuselage 2. Because rotor battery pack 20 and rotor blade controller 22 are physically separate from the onboard controller 25, there is no need for mechanical or electrical linkages between onboard controller 25 and the rotating blade assemblies. Instead, the rotor assemblies 10 are self-contained units and onboard controller 25 utilizes wireless communications to direct rotor blade controllers 22 to continuously adjust the pitch of each of each blade 28 as it rotates about fuselage 2.

There is preferably one rotor blade assembly for each blade 28 on each rotor assembly 10. The rotor blade assemblies shown in FIGS. 5, 7, and 8 comprise a high speed electric actuator drive 32, such as the brushless DC motors available from ARC Systems, electrically connected to rotor blade controller 22, actuator drive amplifier 36, and rotor battery pack 20. Actuator drive amplifier 36, which may conveniently be a brushless motor servo amplifier such as those available from Advanced Motion Controls, accepts torque commands from rotor blade controller 22 and causes actuator drive 32 to produce the commanded torque. Actuator drive 32 is mechanically connected to rotor blade 28, preferably through an actuator gear 34. Upon receiving signals from onboard controller 25, rotor blade controller 22 causes actuator drive amplifier 36 and high speed actuator drive 32 to adjust the pitch, or angle of attack, of each rotor blade 28.

Preferably, each rotor blade 28 is a low profile propeller blade of the type commonly used on tilt rotor aircraft and well known to those of ordinary skill in the art. Blade pitch actuator drive 32 and actuator gear 34 are preferably adapted to continuously adjust the pitch angle of the rotor blade through at least 120 degrees. For successful flight operations, it is important that wireless interface 24, rotor blade controller 22, actuator drive amplifier 36, actuator drive 32, and actuator gear 34 be adapted to operate at a speed sufficient to be able to finely adjust the pitch of each rotor blade 28 throughout its rotation. As is described in more detail below, the pitch angle of each blade 28 may vary as much as 120 degrees or more in the course of a single rotation of the blade 28 about axis 8. A low backlash in actuator gear 34 is important both in obtaining precise orientations and fast positioning. In one preferred embodiment, precision spur gears, such as those available from Stock Drive Products may suitably be utilized with an actuator drive gear ratio of 32:9. As will be clear to those of ordinary skill in the art, the required high speed internal wireless communication can be achieved through the use a wideband radio-frequency (RF) data link 30 shown in FIG. 4, preferably a wireless high speed digital data network such as IEEE 802.11 or others well known to those of ordinary skill in the art, and protocol (not illustrated) between onboard controller 25 and rotor blade controllers 22, in combination with a high speed central processing unit (CPU) (not illustrated) in rotor blade controllers 22 programmed to communicate with onboard controller 25. In addition to receiving commands from onboard controller 25, the CPU may conveniently receive feedback data from conventional low profile optical encoders (not illustrated), such as those available from Renco and capable of encoding 2048 lines per revolution at 8000 RPM. Such encoders may conveniently be electrically connected to rotor blade controller 22 and adapted to read the rotational position of conventional sensor rings (not illustrated) mechanically connected to the shafts of actuator drives 32 whereby the pitch angle of each blade may be determined by rotor controller 22, and wirelessly communicated to onboard controller 25 via data link 30. Based on the information from the encoders and the commands from onboard controller 25, the rotor blade controller 22 generates commands to the actuator drive amplifier 36, which in turn powers actuator drive 32 to adjust the pitch of the rotor blades 28 throughout the blade's rotation about axis 8.

An onboard controller 25 (FIGS. 2-3) is responsible for receiving flight commands, determining how the speed of rotor assemblies 10 and pitch of the individual blades 28 need to be adjusted for the vehicle 1 to execute the flight commands, and directing the rotor drive motor 16 and rotor blade controllers 22 to make the necessary adjustments in rotor speed and blade pitch. Onboard controller 25 comprises a computer-based controller 38, at least one three axis accelerometer 40, at least one three-axis rate gyroscope 42, an onboard wireless interface 44 adapted to communicate with the rotor assembly wireless interfaces 24, and an onboard transceiver 46 and antenna 48 adapted to wirelessly communicate with a remote flight control module 50 (FIG. 10), described more fully below. The computer-based controller 38 comprises a high speed CPU (not illustrated) such as the P501 from General Microsystems, programmed to translate flight commands received from the remote flight control module 50 into commands to adjust rotor speed and blade pitch such that the rotor blades generate the lift, rotational, and directional forces necessary for rotorcraft 1 to execute flight commands. The onboard controller 25 and rotor drive system 14 are powered by a main battery pack 52, preferably comprising rechargeable lithium-polymer batteries of the type that are well known to those of ordinary skill in the art. The computer-based controller 38 is electrically connected to three-axis accelerometer 40 and three-axis rate gyroscope 42, both of which may preferably be powered by main battery pack 52, and both of which provide real time data indicating angular rates and acceleration to the CPU of the computer-based controller 38 and enabling computation of orientation and velocity. Computer-based controller 38 also receives flight commands from remote flight control module 50 via another RF link. As is discussed in more detail below, the RF link to remote flight control module 50 is bi-directional, thereby allowing computer-based controller 38 to communicate flight and related data back to remote flight control module 50. The programming in the computer-based controller 38 analyzes the flight commands received from the remote flight control module 50 together with the data from accelerometer 40 and rate gyro 42 and the rotor speed and pitch of each blade 28 at each point in rotation, and calculates the changes required in the speed of each rotor and the pitch of each blade in order to execute the flight command. Computer based controller 38 then directs rotor drive system 14 and movement of the blade assemblies as required.

Remote flight control module 50 is a remote station from which rotorcraft 1 may be flown. Remote flight control module 50 comprises a set of manually operable flight controls 53 and a wireless flight control transceiver 54 and antenna 56 adapted to wirelessly communicate with the onboard transceiver 46. It is also may comprise a display 58 capable of displaying flight, operational, system status, and related data to the operator. Remote flight control module 50 may be in the form of a sit-down flight operations console (not illustrated), or a handheld unit 50. In the handheld unit embodiment, flight controls 53 may conveniently comprise a first joy stick 60 adapted such that fore-aft movement commands vehicle engine power and collective pitch and left-right movement commands left or right vehicle rotation and a second joystick 62 adapted such that fore-aft movement commands vehicle pitch and left-right movement commands vehicle roll. A landing gear control 64 commands deployment or retraction of landing gear 66 discussed more fully below.

Figure 11:
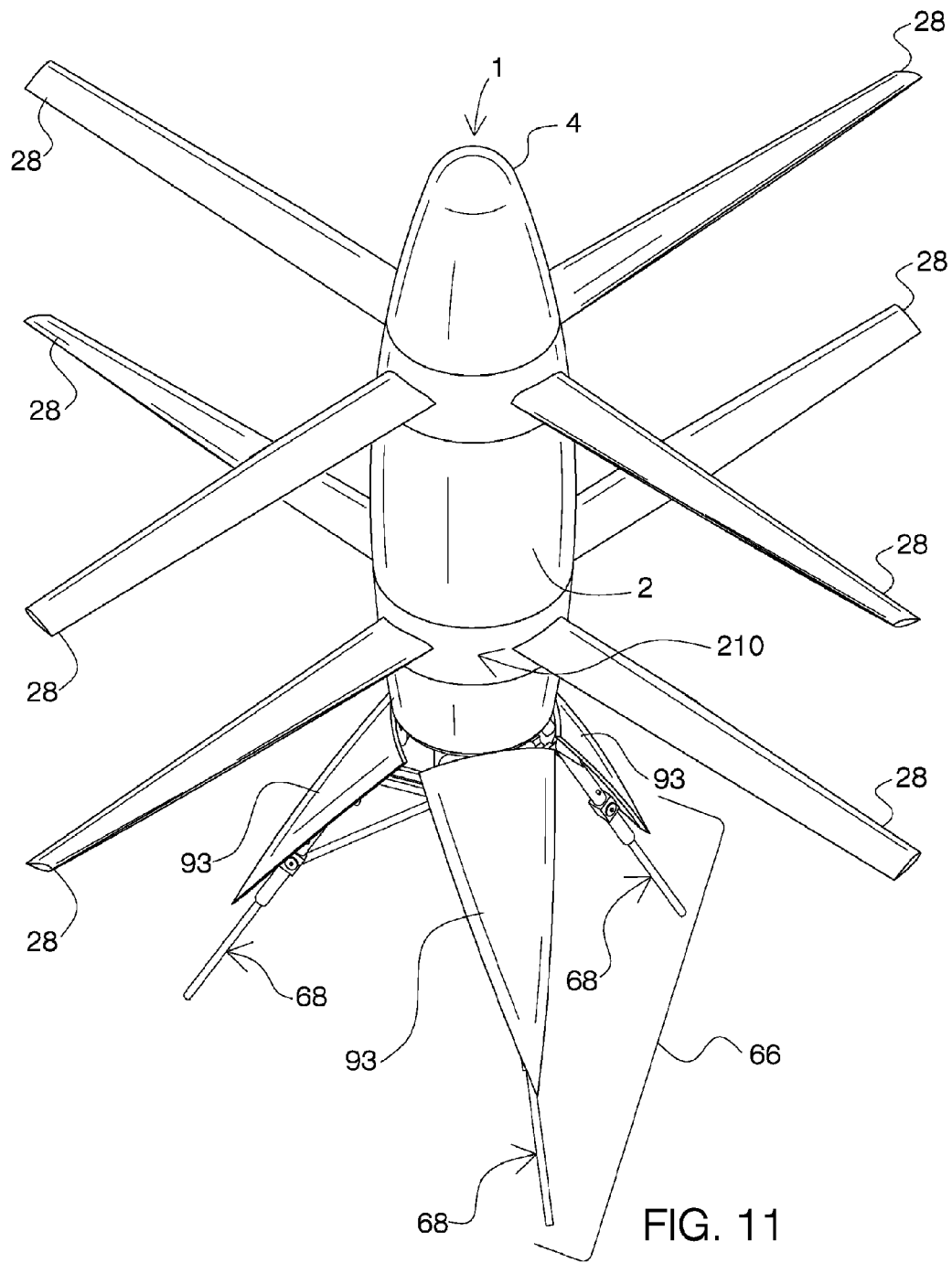
FIG. 11 is a perspective view of one preferred embodiment of the rotorcraft of the present invention with landing gear.

For take off and landing, the rotorcraft of the present invention may include a landing gear 66 proximate to the aft end 6 of fuselage 2 and illustrated in FIG. 11. As is discussed above and illustrated in FIG. 1, the rotorcraft 1 of the present invention has a longitudinal axis 8 running from the forward end 4 through to the aft end 6 of fuselage 2. Within this specification, rotorcraft orientation is discussed with respect to longitudinal axis 8 and the ground. Accordingly, said landing gear 66 is conveniently adapted to support rotorcraft 1 in a generally vertical orientation. Landing gear 66 comprises at least three struts 68 extending from fuselage 2 proximate to aft end 6, and below aft rotor 210, preferably in a tripod configuration.

For superior aerodynamic performance, landing gear 66 may be retractable. In such an embodiment, landing gear 66 may comprise at least 3, and preferably exactly 3, retractable struts 68, and a electric landing gear motor 70. Landing gear motor 70 is preferably powered by main battery pack 52. To produce the commanded currents and resulting torques in landing gear motor 70, landing gear motor amplifier 72 is utilized. Accordingly, computer based controller 38 is electrically connected to landing gear motor amplifier 72 which, in turn, is connected to landing gear motor 70, said connections being adapted to enable onboard controller 25 to cause landing gear motor 70 to rotate in either direction, whereby landing gear struts 68 are deployed and retracted.

Figure 12:
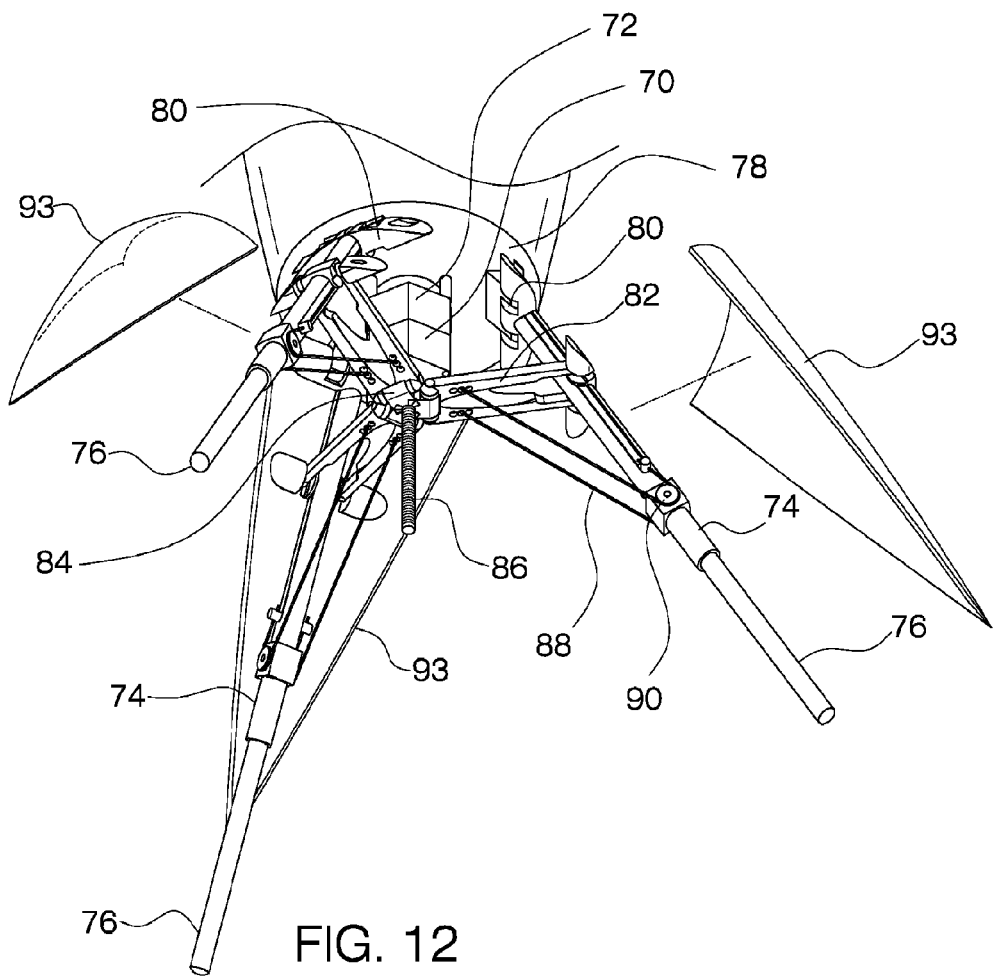
FIG. 12 is a partially exploded, perspective view of the deployed landing gear of one preferred embodiment of the rotorcraft of the present invention.
Figure 13:
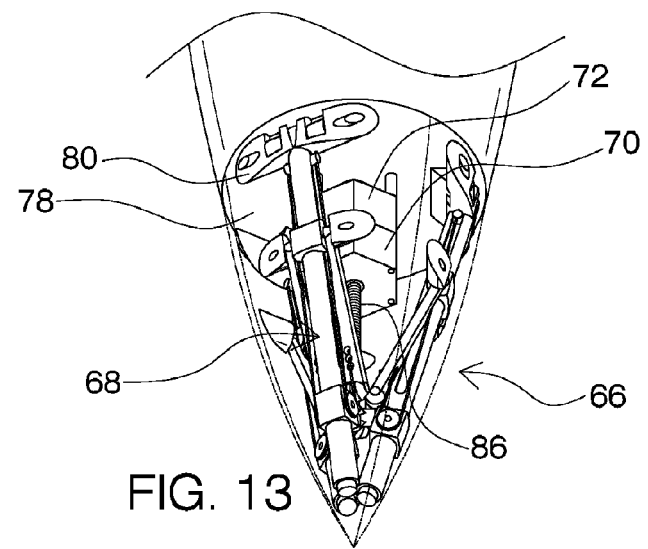
FIG. 13 is a fragmentary, perspective view of the retracted landing gear of one preferred embodiment of the rotorcraft of the present invention, with portions of the rotorcraft shown in phantom, FIGS. 14-A and 14-B are a schematic view of the flight method of the present invention.

One embodiment of the structure of the retractable landing gear 66 of the present invention is illustrated in FIGS. 11-13. In such an embodiment, landing struts 68 comprise two telescoping sections. The uppermost section 74 being connected to a bulkhead 78 via a hinged mechanical connection 80, and the lowermost section 76 being adapted to retract within uppermost section 74. Uppermost section 74 may be movably attached to a support arm 82 running from said strut 68 to threaded runner 84 on a central threaded rod 86 that is, in turn, driven by landing gear motor 70 such that, upon rotation of threaded rod 86 in a first direction, runner 84 is driven down threaded rod 86, thereby causing lowermost section 76 to retract and, upon rotation of threaded rod 86 in the opposite direction, said runner 84 is driven up threaded rod 86, thereby causing landing strut 68 to deploy. A cable or line 88, conveniently made of high strength monofilament line or other materials well known to those of ordinary skill in the art, may conveniently attach to arm 82 proximate to the connection to said runner 84 on one end, proceed through a pulley 90 or similar turning structure on strut 68, and to the upper end of lowermost section 76 of strut 68, and be adapted such that upon deployment, said line urges lowermost section 76 to extend. Internal to strut 68 there is preferably an extension spring (not illustrated) running from lowermost section 76 to a point proximate to the upper end of uppermost section 74. The spring is adapted to keep tension on line 88 and to pull lowermost section 76 into uppermost section 74 as landing gear 66 retracts.

For aerodynamic efficiency, fuselage 2 may further comprise cowl sections 93 proximate to aft end 6. Cowl sections 93 may conveniently be mechanically attached to uppermost section 74 and adapted to close, thereby covering landing gear 66 when retracted. Cowl sections 93 thereby open as retractable landing gear 66 deploys and close as landing gear 66 retracts.

As is discussed above, the rotor drive system 14 of the rotorcraft may conveniently comprise a single rotor drive motor 16 (FIG. 3) or two sets of rotor drive motors (FIG. 2), one set being a forward rotor drive motor set 162 and one being an aft rotor drive motor set 164. In embodiments utilizing a single rotor drive motor 16, motor 16 is mechanically connected to both the forward 110 and aft 210 rotor assemblies through forward gear set 118 and aft gear set 218 respectively. In such embodiments, aft gear set 218 is adapted to reverse the rotation of aft rotor assembly 210, but otherwise maintain a generally equal rotational speed between forward rotor assembly 110 and aft rotor assembly 210. Rotor drive motor 16 is mechanically connected to both forward gear set 118 and aft gear set 218, and is electrically connected to computer based controller 38. Drive motor 16 is also electrically connected to main battery pack 52, preferably through drive motor amplifier 92. Computer based controller 38 outputs a low level voltage command to drive motor amplifier 92 which then drives motor 16 with power from the main battery pack 52. Drive motor 16 may conveniently be a brushless, direct current electric motor such as are well known to those of ordinary skill in the art.

Figure 6:
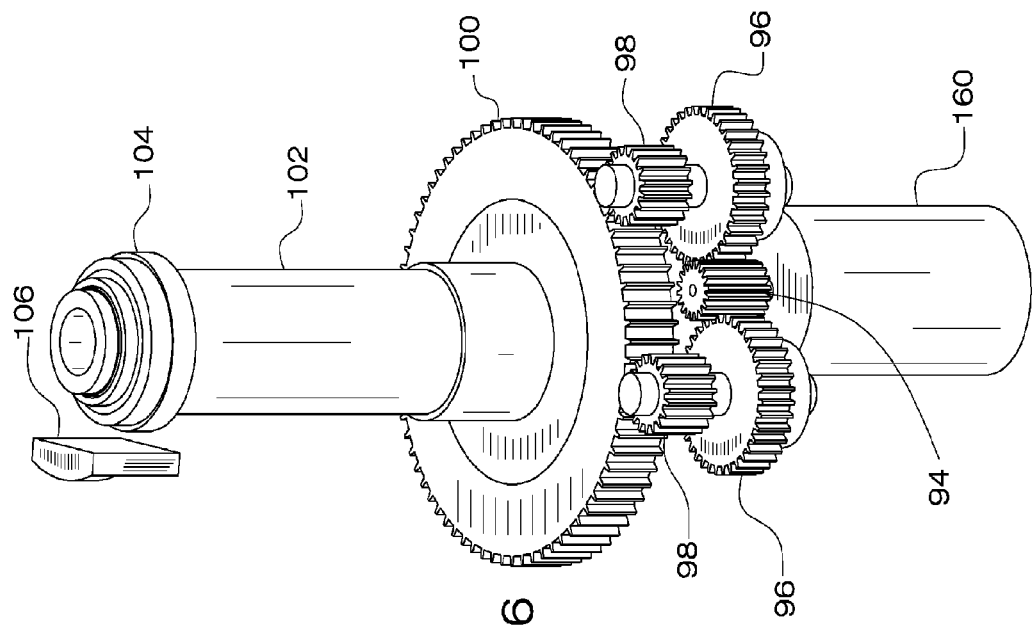
FIG. 6 is a perspective view of a rotor drive gear assembly and rotor drive motor of one preferred embodiment of the rotorcraft of the present invention.

In an alternate embodiment shown in FIG. 2, rotor drive system 14 may conveniently comprise two sets of rotor drive motors, one set being a forward rotor drive motor set 162 and one being an aft rotor drive motor set 164. In one preferred embodiment, motors capable of generating 1200 W-1500 W continuously, such as the 1515/1.5 Y DC motors available from Neumotors, may be utilized to deliver the power necessary to drive rotor assemblies 10. To power the motors, power amplifiers 92 rated at 125 A peak and 100 A continuous current, such as the SH-96 available from Aveox, are paired with each drive motor. Forward rotor drive motors 162 are mechanically connected to forward gear set 118 and aft rotor drive motors are mechanically connected to aft gear set 218. Each such gear set 118 and 218 (FIG. 6) may comprise a motor shaft gear 94 being centrally positioned between two equally-sized primary reduction gears 96. Each primary reduction gear 96 may be mechanically connected to pinion gear 98 which, in turn, is adapted to engage a main drive gear 100 mounted to drive shaft 102. Drive shaft 102 is preferably hollow, thereby allowing a space for electrical connections between computer based controller 38, main battery pack 52, rotor drive motors 160, and landing gear drive motor 70. As is shown in FIGS. 6-8, drive shaft 102 may also have attached to it magnetic ring 104 which is adapted to be read by encoder 106, whereby computer-based controller 38 may determine the rotational position and speed of forward rotor assembly 110 and aft rotor assembly 210, respectively. Utilizing the above-described gear set structure allows for multiple, and preferably four, drive motors 162 or 164 to simultaneously drive each rotor assembly 10. In this configuration, and as is illustrated in FIG. 8, main battery pack 52 may comprise three pluralities of lithium polymer cells, one plurality 152 directly surrounding forward drive motor set 162, one plurality 352 directly surrounding aft drive motor set 164 and a third plurality 252 positioned therebetween. In this way, main battery pack 52 may comprise a large number of individual cells as required to meet the power requirements of onboard controller 25, rotor drive system 14 and landing gear 66. Suitable cells for main battery pack 52 may be obtained from a variety of sources and wired in a variety of configurations that will be obvious to those of skill in the art. One such suitable configuration utilizes cells rated at 3.7V and 2000 mA-hr, such as those from Kokam. Such cells are capable of delivering a continuous 30 A current with a peak current of 60 A. Using such cells, pluralities 152 and 352 may comprise eight cells per drive motor 160, for a total of 32 cells, wired to generate 29.6V per motor. Similarly center plurality 252 may conveniently comprise another group of 32 such cells, thereby providing a total of 96 main power cells. In such configurations, the cells may be wired as groups of 8 connected in series.

In addition to the rotorcraft 1 of present invention, a method of flying a dual rotor, vertical take off and landing rotorcraft 501, which may suitably be substantially similar to rotorcraft 1, is also disclosed and is illustrated in FIGS. 14-18. The rotorcraft 501 comprises a fuselage 502 having a top side or upwardly facing portion 514 when in horizontal flight, bottom side or downwardly facing portion 516, a forward end 504, and an aft end 506, and two co-axial, counter-rotating rotor assemblies 511, 512 rotating about a longitudinal axis 508 extending generally through said forward end 504 and said aft end 506. The rotor assemblies 511, 512 consist of forward rotor assembly 511 positioned proximate to forward fuselage end 504 and an aft rotor assembly 512 positioned proximate to aft fuselage end 506. Each rotor assembly 511, 512 comprises two or more, but preferably four, independently controllable, continuously-variable-pitch blades 528. In this specification, angles of rotation of rotor blades 528 about longitudinal axis 508 are discussed with reference to a point 515 on the top fuselage side 514 and the direction of rotation. Positive rotation of a rotor blade is taken to indicate an increasing rotation angle even though the rotors rotate in opposite directions. This point 515 can be selected at any point on upwardly facing portion, or top side 514 as shown on FIGS. 14 and 16. More particularly, a blade 528 that is pointed directly at point 515 (FIG. 16) on the top fuselage side 514 has a rotation angle of zero. That blade 528 will pass through blade angles of 45 degrees, to 90 degrees, to 180 degrees, whereupon it is pointed directly at bottom fuselage side 516. Similarly, pitch angle in this specification is discussed relative to the plane of rotation of rotor assemblies 511, 512. Accordingly, a blade 528 that is aligned parallel with the plane of rotation is said to have a zero pitch angle. A blade 528 that is perpendicular to the plane of rotation is said to have a 90 degree pitch angle if the forward edge of the blade 528 is directed toward the forward fuselage end 504, and a −90 degree pitch angle if the forward edge of blade 528 is directed toward aft fuselage end 506. Blade angles required for flight in various orientations will vary based on the blade cross section, profile, and total blade area.

The power to weight ratio of rotorcraft 501 should preferably be between five and ten pounds per installed horsepower. Because the rotors preferably turn moderately fast the areas of blades 528 can preferably be made small. To provide ample margins of safety against blade stall, and because the blades may conveniently be thin with small camber, lift coefficients less than 0.8 may be used. The result is a rotorcraft 501 with total installed power requirements similar to that of a traditional helicopter, reasonable transition power requirements, and small total rotor blade surface area.

The method comprises the step of taking off from an orientation in which longitudinal axis 508 is generally vertical as is shown at the left side of FIG. 14-A. Take off is accomplished by adjusting the pitch of each blade 528 to approximately equivalent angles of attack, thereby generating vertical lift without creating undesired horizontal forces. By maintaining the same torque on the two counter-rotating rotors 511, 512, the torque generated by the rotors 511, 512 cancel, thereby preventing undesired rotation about longitudinal axis 508. Typical blade angles of the blades 528 of forward rotor assembly 511 and aft rotor assembly 512 during vertical hover are summarized in the following table. Take off is accomplished by increasing the blade angles and rotational speed as required depending on payload.

| Vertical Orientation: Hovering, craft pitch = 0° | | | | | | | |
|---|---|---|---|---|---|---|---|
| Rotation angle of blade | | | | | | | |
| 0 | 45 | 90 | 135 | 180 | 225 | 270 | 315 |
| FWD rotor blade angle 15 | 15 | 15 | 15 | 15 | 15 | 15 | 15 |
| AFT rotor blade angle 15 | 15 | 15 | 15 | 15 | 15 | 15 | 15 |

The method further comprises transitioning to generally horizontal flight, as is shown in the second through fourth depictions in FIG. 14-A, by adjusting the pitch of the blades 528 of rotor assemblies 511, 512 to generate forces perpendicular to longitudinal axis 508 until the rotorcraft attains an orientation in which longitudinal axis 508 is generally horizontal. Generally, when transitioning to horizontal flight it is desirable, but not necessary, to do so in a manner that results in the point 515 of the top side 514 of fuselage 502 being opposite the ground and the bottom side 516 of fuselage 502 generally facing the ground. Transition is preferably accomplished by transitioning blade angles from angles appropriate for vertical hover to angles appropriate for horizontal flight, examples of which are shown herein and made clear to those of ordinary skill in the art by the explanations and figures included herein. For illustration purposes, typical blade angles of the blades 528 of forward rotor assembly 511 and aft rotor assembly 512 at the mid point of the transition from vertical to horizontal flight (second depiction in FIG. 14-A) are summarized in the following table.

| Vertical Orientation: Moving forward, craft pitch = 25° | | | | | | | | |
|---|---|---|---|---|---|---|---|---|
| | Rotation angle of blade | | | | | | | |
| | 0 | 45 | 90 | 135 | 180 | 225 | 270 | 315 |
| FWD rotor blade angle | 35 | 41 | 43 | 41 | 35 | 29 | 27 | 29 |
| AFT rotor blade angle | 35 | 41 | 43 | 41 | 35 | 29 | 27 | 29 |

The method further comprises the step of flying in a generally horizontal orientation by adjusting the pitch of blades 528 of rotor assemblies 511, 512 such that each blade 528 has a greater blade angle when rotating from fuselage top side 514 to fuselage bottom side 516 than when blade 528 is rotating from fuselage bottom side 516 to fuselage top side 514. While in horizontal flight, the tips of rotor blades 528 describe long helical spirals through the air. Accordingly, the airspeed seen by rotor blades 528, when the rotational speed of blades 528 is such that the blade tips are tracing arcs at 25 degrees from the horizontal, the blade tip speeds are only 10% faster than the speed of rotorcraft 501 itself. Rotorcraft 501 typically obtains lift from both down-going and up-going rotor blades 528, with proportionally more lift being generated by the down-going blades 528. As is well understood by those of ordinary skill in the art, the lift from a given rotor blade 528 is increased by increasing the angle of attack of the rotor blade 528 relative to the velocity of the approaching air. For illustration purposes only, typical blade angles of forward rotor assembly 511 and aft rotor assembly 512 during horizontal flight are summarized in the following table.

| Horizontal Orientation: Moving forward, craft pitch = 90° | | | | | | | | |
|---|---|---|---|---|---|---|---|---|
| | Rotation angle of blade | | | | | | | |
| | 0 | 45 | 90 | 135 | 180 | 225 | 270 | 315 |
| FWD rotor blade angle | 70 | 72 | 73 | 72 | 70 | 68 | 67 | 68 |
| AFT rotor blade angle | 70 | 72 | 73 | 72 | 70 | 68 | 67 | 68 |

The method further comprises the step of transitioning back to generally vertical flight by adjusting the pitch of blades 528 to generate forces perpendicular to longitudinal axis 508 until rotorcraft 501 attains a generally vertical orientation, as is shown in FIG. 14-B. Transition is preferably accomplished by transitioning blade angles from angles appropriate for horizontal flight back to angles appropriate for vertical hover. This is essentially the reverse of transition from vertical hover to horizontal flight described in greater detail above with respect to FIG. 14-A.

The method further comprises the step of landing in a generally vertical orientation. Landing is essentially the reverse of the take off step described more fully above with respect to FIG. 14-A.

The step of transitioning to horizontal flight in the method may further comprise additional steps. The additional steps comprise adjusting the pitch of blades 528 to generate horizontal velocity in the desired direction of travel as is illustrated in FIG. 18, further adjusting the pitch of blades 528 to cause forward fuselage end 504 to become oriented toward the desired direction of travel as is illustrated in FIG. 17, and further increasing velocity until rotorcraft 501 attains a generally horizontal orientation as is illustrated in FIG. 16. For suitably sized vehicles, the transition may typically be accomplished in this manner when the blade speed relative to the wind at the 0.7 radius of blade 528 is 313 feet per second and the lift coefficient is 0.8. Similarly, and as is illustrated in FIG. 18, horizontal velocity while in vertical hover may be attained without substantially changing orientation by adjusting the pitch of rotor blades 528 such that the blades 528 of forward rotor assembly 511 and the blades 528 of aft rotor assembly 512 generate proportionally more lift when they are diametrically opposed and moving away from and oriented perpendicular to the desired direction of travel. For illustration purposes only, typical blade angles of the blades of forward rotor 511 and the blades of aft rotor 512 needed to generate horizontal forces in the direction of top fuselage side 515 during vertical hover are summarized in the following table.

| Vertical Orientation: Moving toward top side of fuselage, craft pitch = 0° | | | | | | | | |
|---|---|---|---|---|---|---|---|---|
| | Rotation angle of blade | | | | | | | |
| | 0 | 45 | 90 | 135 | 180 | 225 | 270 | 315 |
| FWD rotor blade angle | 15 | 18 | 19 | 18 | 15 | 12 | 11 | 12 |
| AFT rotor blade angle | 15 | 18 | 19 | 18 | 15 | 12 | 11 | 12 |

Those of ordinary skill in the art will recognize that additional steps may be added to the above embodiments of the flight method, including without limitation transitioning between various flight orientations and directions, and between stationary hovering and forward velocity, and that variations including such additional steps are also effective and are also within the scope of the present invention.

The rotorcraft 1 of the present invention exhibits several desirable flight characteristics. When hovering in a vertical orientation, the rotorcraft has a significant maneuvering advantage over traditional vehicles such as helicopters. In a helicopter, horizontal forces are realized by tilting the rotor axis. As is illustrated in relation to FIG. 18, rotorcraft 1 can develop horizontal forces without tilting its axis by adjusting continuously variable pitch blade assemblies 10 such that blades 28 of forward rotor assembly 110 produce additional lift when oriented 90 degrees from the desired direction of travel, and blades 28 of aft rotor assembly 210 produce a substantially equal amount of additional lift when also oriented 90 degrees from the desired direction of travel, thereby producing side force without changing vehicle attitude. Similarly, rotorcraft 1 can rotate about its longitudinal axis 8 by varying the collective pitch between rotor assemblies 110 and 210 so that their torques do not cancel. The result is excellent maneuverability when hovering, the ability to quickly adjust to wind gusts and turbulence, reasonable total power requirements, reasonable transition power requirements, and a small total rotor blade surface area.

The rotorcraft of the present invention has several practical applications. As an unmanned vehicle, it is well suited to applications including, but not limited to, automated border patrol and surveillance, identification of "hot spots" in dense forest fires, automated package delivery, automated aerial photography, and sky writing. In larger embodiments, the rotorcraft of the present invention may be adapted to carry passengers and cargo quickly and efficiently.

While the foregoing describes preferred embodiments of the rotorcraft and flight method of the present invention, it is to be understood that this description is to be considered as illustrative of the principles of the invention and is not to be limitative thereof, as numerous other variations, all within the scope of the invention, will readily occur to others of ordinary skill in the art.

I claim:

1. A dual rotor vertical take off and landing rotorcraft and flight control apparatus therefor, said rotorcraft having a fuselage with a forward end and an aft end and a longitudinal axis extending generally through said forward end and said aft end, and being capable of flight in orientations ranging from those in which said longitudinal axis is generally horizontal to those in which said longitudinal axis is generally vertical, comprising:
    a rotor drive system comprising at least one rotor drive motor and at least one rotor drive gear set;
    two counter-rotating rotor assemblies coaxial with said longitudinal axis and mechanically connected to said rotor drive system, one said rotor assembly being a forward rotor assembly positioned proximate to said forward end and one said rotor assembly being an aft rotor assembly positioned proximate to said aft end, each said rotor assembly comprising
        a rotor battery pack, a rotor blade controller electrically connected to said rotor battery pack, a wireless rotor blade interface electrically connected to said rotor blade controller, and at least two continuously-variable-pitch blade assemblies, each said blade assembly comprising
            an actuator drive electrically connected to said rotor blade controller, and one variable pitch rotor blade mechanically connected to each said actuator drive to provide independently controllable, continuously variable pitch to each said rotor blade;
said rotorcraft further comprising
    a main battery pack,
    an onboard controller, and
    said onboard controller being electrically connected to said main battery pack and said rotor drive system, and comprising
        a computer-based controller,
        a three-axis accelerometer electrically connected to said computer-based controller,
        a rate gyroscope electrically connected to said computer-based controller,
        an onboard transceiver electrically connected to said computer-based controller, and
        an onboard wireless interface electrically connected to said computer-based controller and wirelessly connected to said wireless rotor blade interfaces;
    and a remote flight control module wirelessly communicating with said onboard transceiver, and comprising
        manually operable flight controls and
        a wireless flight control module transceiver electrically connected to said manually operable flight controls and adapted to wirelessly communicate with said onboard transceiver;
wherein said remote flight control module transmits flight commands to said onboard controller and said onboard controller directs said rotor drive motor to adjust the speed of said rotor assemblies and wirelessly directs said rotor blade controllers to independently adjust the pitch of each said rotor blade throughout rotation, whereby said rotor blades develop lift and directional forces sufficient to cause said rotorcraft to execute said flight commands.

2. A vertical take off and landing rotorcraft and flight control system as in claim 1 further comprising landing gear proximate to said aft end dimensioned and configured to support said rotorcraft with said longitudinal axis in a generally vertical orientation.

3. A vertical take off and landing rotorcraft and flight control system as in claim 2 wherein said landing gear comprises
    at least three retractable struts,
    an electric landing gear motor mechanically connected to said struts and electrically connected to said onboard controller,
    wherein, said onboard controller causes said landing gear motor to deploy or retract said struts.

4. A vertical take off and landing rotorcraft and flight control system as in claim 1 wherein said rotor drive system comprises
    two rotor drive gear sets, one said gear set being a forward rotor drive gear set mechanically connected to said forward rotor assembly and one said gear set being an aft rotor drive gear set mechanically connected to said aft rotor assembly, and
    a single rotor drive motor mechanically connected to said forward rotor drive gear set and said aft rotor drive gear set
wherein said rotor drive gear sets are adapted such that said rotor drive motor drives said forward rotor assembly and said aft rotor assembly to rotate at generally identical speeds in opposite directions.

5. A vertical take off and landing rotorcraft and flight control system as in claim 1 wherein said rotor drive system comprises
    two rotor drive gear sets, one said gear set being a forward rotor drive gear set mechanically connected to said forward rotor assembly and one said gear set being an aft rotor drive gear set mechanically connected to said aft rotor assembly, and
    at least one forward rotor drive motor mechanically connected to said forward rotor drive gear set and
    at least one aft rotor drive motor mechanically connected to said aft rotor drive gear set.

6. A method of flying a dual-rotor vertical take off and landing rotorcraft and flight control system therefor comprising a fuselage having a top side, a bottom side, a forward end, and an aft end, and two co-axial, counter-rotating rotor assemblies rotating about a longitudinal axis extending generally through said forward end and said aft end, one said rotor assembly being a forward rotor assembly and positioned proximate to said forward end and one said rotor assembly being an aft rotor assembly and being positioned proximate to said aft end, each said rotor assembly comprising two or more independently controllable, continuously-variable-pitch blade assemblies, said method comprising the steps of
    taking off from a generally vertical orientation in which said longitudinal axis is generally vertical;
    transitioning to generally horizontal flight by adjusting the pitch of each said independently controllable, continuously-variable-pitch blade of each of said blade assemblies to generate forces perpendicular to said longitudinal axis until said rotorcraft attains a generally horizontal orientation in which said longitudinal axis is generally horizontal;

flying in a generally horizontal orientation by adjusting the pitch of the blades of said rotor assemblies such that each blade has a greater blade angle when rotating from said top side of said fuselage to said bottom side of said fuselage than when said blade is rotating from said bottom side of said fuselage to said top side of said fuselage;

transitioning to generally vertical flight by adjusting the pitch of the blades of said blade assemblies to generate forces perpendicular to said longitudinal axis until said rotorcraft attains a generally vertical orientation in which said longitudinal axis is generally vertical; and landing in a generally vertical orientation.

7. A method of flying as in claim 6 wherein the step of transitioning to generally horizontal flight further comprises the steps of adjusting the pitch of the blades of said rotor assemblies to generate horizontal velocity in the desired direction of travel, further adjusting the pitch of the blades of said rotor assemblies to cause said forward end to become oriented toward said desired direction of travel, and further increasing velocity until said rotorcraft attains a generally horizontal orientation in which said longitudinal axis is generally horizontal.

8. A method of flying as in claim 6 further comprising the step of flying in a generally vertical orientation while moving in a direction of travel generally transverse to said longitudinal axis by adjusting the pitch of the blades of said rotor assemblies such that the blades of said forward rotor assembly and said aft rotor assembly generate proportionally greater lift when they are diametrically opposed and generally perpendicular to said direction of travel.

* * * * *